(12) United States Patent
Shirai et al.

(10) Patent No.: US 9,715,118 B2
(45) Date of Patent: Jul. 25, 2017

(54) STEREOSCOPIC IMAGE DISPLAY DEVICE

(71) Applicant: Japan Display Inc., Tokyo (JP)

(72) Inventors: Kouichi Shirai, Tokyo (JP); Suguru Ishiwata, Tokyo (JP)

(73) Assignee: Japan Display Inc., Tokyo (JP)

(*) Notice: Subject to any disclaimer, the term of this patent is extended or adjusted under 35 U.S.C. 154(b) by 49 days.

(21) Appl. No.: 14/723,232

(22) Filed: May 27, 2015

(65) Prior Publication Data

US 2015/0346503 A1   Dec. 3, 2015

(30) Foreign Application Priority Data

Jun. 2, 2014 (JP) .................................. 2014-114328

(51) Int. Cl.
*G02F 1/1345* (2006.01)
*G02B 27/22* (2006.01)
*G02F 1/1343* (2006.01)

(52) U.S. Cl.
CPC ....... *G02B 27/2214* (2013.01); *G02F 1/1345* (2013.01); *G02F 1/134309* (2013.01)

(58) Field of Classification Search
CPC ... G02F 2001/136263; G02F 1/136259; G02F 2001/136254; G02F 1/1345; G02F 1/13458; G09G 3/3692; H01L 27/3281; H01L 27/3288; H01L 27/329
See application file for complete search history.

(56) References Cited

U.S. PATENT DOCUMENTS

2012/0154359 A1   6/2012   Shibata et al.
2016/0037155 A1*  2/2016   Yoshino ............. G02B 27/2214
                                                        348/51

FOREIGN PATENT DOCUMENTS

| CN | 103543532 A | 1/2014 |
| JP | 2012132944 A | 7/2012 |
| TW | 201217836 A | 5/2012 |

OTHER PUBLICATIONS

Chinese Office Action dated Apr. 6, 2017 for corresponding CN Patent Application No. 201510296699.5, with translation.

* cited by examiner

*Primary Examiner* — Nathanael R Briggs
(74) *Attorney, Agent, or Firm* — Typha IP LLC (57) ABSTRACT

A parallax barrier panel includes plural sub-areas which are arranged in an X direction, plural light-shielding area each of which includes the plural sub-areas in a light-shielding state, and plural light-transmitting areas each of which includes the plural sub-areas in a light-transmitting state and which are arranged alternately with the plural light-shielding areas in the X direction. The sub-areas extend in a Y direction and can be switched between the light-transmitting state and the light-shielding state. Each of the sub-areas is provided with an electrode for controlling a liquid crystal layer. A first electric line is connected to an upper end part of the electrode, and a second electric line is connected to a lower end part of the electrode.

5 Claims, 9 Drawing Sheets

STEREOSCOPIC IMAGE DISPLAY DEVICE

CROSS-REFERENCE TO RELATED APPLICATION

The present application claims priority from Japanese application JP2014-114328 filed on Jun. 2, 2014, the content of which is hereby incorporated by reference into this application.

BACKGROUND OF THE INVENTION

1. Field of the Invention

The present invention relates to a stereoscopic image display device of a parallax barrier system.

2. Description of the Related Art

As disclosed in, for example, JP 2012-132944 A, a stereoscopic image display device of a parallax barrier system includes a display panel having pixels formed therein and a parallax barrier panel disposed on a display surface of the display panel. The parallax barrier panel includes light-shielding areas and light-transmitting areas, each of which extends in a longitudinal direction and which are alternately arranged in a lateral direction. The parallax barrier panel includes a liquid crystal layer, and the transmission of light through the liquid crystal layer is controlled by the liquid crystal layer, so that the light-shielding areas and the light-transmitting areas are formed. One of two substrates sandwiching the liquid crystal layer includes electrodes each of which extends in the longitudinal direction and which are arranged in the lateral direction. The liquid crystal layer is driven by the electric field generated by the electrodes.

SUMMARY OF THE INVENTION

In the structure in which the positions of the light-shielding areas and the light-transmitting areas are fixed, when a relative position between a viewer and the display device is shifted from a previously set position, it may be caused that the viewer can not recognize an image on the display panel as a stereoscopic image. Then, a parallax barrier panel is studied which has a function to adjust the positions of the light-shielding areas and the light-transmitting areas (hereinafter, this function is referred to as a "multi-position function"). According to this parallax barrier panel, when the relative position between the viewer and the display device is shifted, the positions of the light-transmitting areas and the light-shielding areas are adjusted according to the relative position. Thus, the viewer can recognize an image on the display panel as a stereoscopic image.

The multi-position function is enabled by defining plural areas (hereinafter, this area is referred to as a sub-area) having widths smaller than the light-shielding areas and the light-transmitting areas. The plural sub-areas are arranged in the lateral direction and each of them is switchable between the light-shielding state and the light-transmitting state. Each of the light-shielding areas and the light-transmitting areas is formed of plural continuous sub-areas. For example, when nth to (n+2)th sub-areas are in the light-shielding state, the three sub-areas form one light-shielding area. Besides, when (n+3)th to (n+5)th sub-areas are in the light-transmitting state, the three sub-areas form one light-transmitting area. Thereafter, when the relative position between the viewer and the display device is shifted, for example, (n+1)th to (n+3)th sub-areas are brought into the light-shielding state, and (n+4)th to (n+6)th sub-areas are brought into the light-transmitting state. By doing so, the positions of the light-shielding area and the light-transmitting area are moved by the width of one sub-area as a whole.

In the parallax barrier panel having such multi-position function, an electrode for driving the liquid crystal is required to be provided for each of the sub-areas. However, since the width of the electrode of the sub-area is smaller than that of the electrode of the related art parallax barrier panel in which the sub-area is not defined, cut (tear) in an electrode is apt to occur.

The invention is made in view of the above problem, and an object thereof is to provide a parallax barrier system stereoscopic image display device which has a multi-position function and enables a viewer to recognize a stereoscopic image even when cut occurs in an electrode.

(1) According to an embodiment of the invention, a stereoscopic image display device includes a display panel including pixels, and a parallax barrier panel including a liquid crystal layer and disposed on a display surface side of the display panel. The parallax barrier panel includes plural sub-areas which arranged in a first direction. Each sub-area extends in a second direction perpendicular to the first direction and is switchable between a light-transmitting state and a light-shielding state. The parallax barrier panel includes plural light-shielding areas each of which is formed of the plural sub-areas in the light-shielding state, plural light-transmitting areas each of which is formed of the plural sub-areas in the light-transmitting state and which are arranged alternately with the plural light-shielding areas in the first direction, an electrode provided in each of the plural sub-areas, extending in the second direction and for controlling the liquid crystal layer, a first electric line connected to one end of two ends of the electrode in the second direction and for applying a voltage to the electrode, and a second electric line connected to the other end of the two ends of the electrode in the second direction and for applying the voltage to the electrode.

(2) In the stereoscopic image display device according to (1), the first electric line and the second electric line may be electrically connected to a common terminal to which an external circuit board is attached.

(3) In the stereoscopic image display device according to (2), the parallax barrier panel may include a probe terminal and an electric line including the first electric line and the second electric line and extending from the common terminal to the electrode, and the probe terminal may be connected to the common terminal through an electric line different from the electric line extending from the common terminal to the electrode.

(4) In the stereoscopic image display device according to (1), the parallax barrier panel may include a first electrode and a second electrode each of which is the electrode, the first electric line and the second electric line connected to the first electrode may be electrically connected to a common first terminal. The first electric line and the second electric line connected to the second electrode may be electrically connected to a common second terminal adjacent to the first terminal.

(5) In the stereoscopic image display device according to (4), the parallax barrier panel may include a transparent substrate on which the first electrode, the second electrode, the first electric line and the second electric line are provided. The transparent substrate may be provided with a first circuit layer and a second circuit layer between which an insulating layer is arranged. The electric line extending from the first terminal to the first electrode and the electric line extending from the second terminal to the second electrode may respectively include portions crossing each other, one of the crossing portions may be formed in the first circuit layer and the other of the crossing portions may be formed in the second circuit layer.

(6) In the stereoscopic image display device according to (5), the parallax barrier panel may include a probe terminal to which a circuit board for inspection is connected and which inspects a circuit including the electric line extending from the second terminal to the second electrode and the second electrode, and an inspection electric line connected to the probe terminal and the second terminal. The electric line extending from the first terminal to the first electrode and the inspection electric line may include portions crossing each other. One of the crossing portions may be formed in the first circuit layer. The other of the crossing portions may be provided in the second circuit layer.

(7) In the stereoscopic image display device according to (1), the parallax barrier panel includes, as the electrode, a plurality of electrode arranged in the first direction. The plural electrodes may form plural unit arrangements repeatedly provided in the first direction. Each of the plural unit arrangements may include at least a first electrode and a second electrode as part of the plural electrodes. A (1-1)th electric line to which the first electrodes in the plural unit arrangements are commonly connected and a (1-2)th electric line to which the second electrodes of the plural unit arrangements are commonly connected may be provided as the first electric line. A (2-1)th electric line to which the first electrodes in the plural unit arrangements are commonly connected and a (2-2)th electric line to which the second electrodes of the plural unit arrangements are commonly connected may be provided as the second electric line.

(8) According to another embodiment of the invention, a stereoscopic image display device includes a display panel including pixels, and a parallax barrier panel disposed on a display surface side of the display panel. The parallax barrier panel includes plural stripe-shaped electrodes arranged in a first direction and extending in a second direction crossing the first direction, a first edge along the first direction, a second edge opposite to the first edge, a third edge along the second direction. The parallax barrier panel includes M (M≥2) first electric lines electrically connected to ends toward the first edge of the stripe-shaped electrodes and arranged along the first sides, M second electric lines electrically connected to ends toward the second edge of the stripe-shaped electrodes and provided along the second edge, and M terminals electrically connected to the first electric lines and the second electric lines. The M stripe-shaped electrodes is continuously arranged to form one set. The plural sets are arranged in the first direction, the first electric line and the second electric line are electrically connected to a third electric line, the third electric line is electrically connected to the terminal, and the Nth (M≥N≥1) stripe-shaped electrode among the M stripe-shaped electrodes included in each of the plural sets is electrically connected to the Nth terminal among the M terminals. The first electric line and the second electric line are provided in a first layer, and the third electric line is provided in a second layer different from the first layer. By doing so, short-circuit between the electric lines can be prevented.

(9) In the stereoscopic image display device according to (8), the stripe-shaped electrode may provide a light-transmitting area or a light-shielding area between the first edge and the second edge.

(10) In the stereoscopic image display device according to (8), an insulating layer may be provided between the first layer and the second layer, the insulating layer may include a hole, and the first electric line and the second electric line may be electrically connected to the third electric line through the hole.

(11) In the stereoscopic image display device according to (8), plural inspection terminals may be provided, and the inspection terminals may be electrically connected to the terminals.

(12) In the stereoscopic image display device according to (8), the inspection terminals and the terminals may be electrically connected through fourth electric lines. The fourth electric lines may be provided in a layer different from the second layer.

DETAILED DESCRIPTION OF THE INVENTION

Hereinafter, an embodiment of the invention will be described with reference to the drawings. The disclosure of the specification is merely an example, and forms modified within the spirit of the invention and easily conceivable by a skilled person in the art should fall within the scope of the invention. Besides, in order to more clarify the description, the widths, thicknesses, shapes and the like of respective parts in the drawings are often schematically shown as compared with actual forms. The drawings are examples and do not limit the interpretation of the invention.

Figure 1:
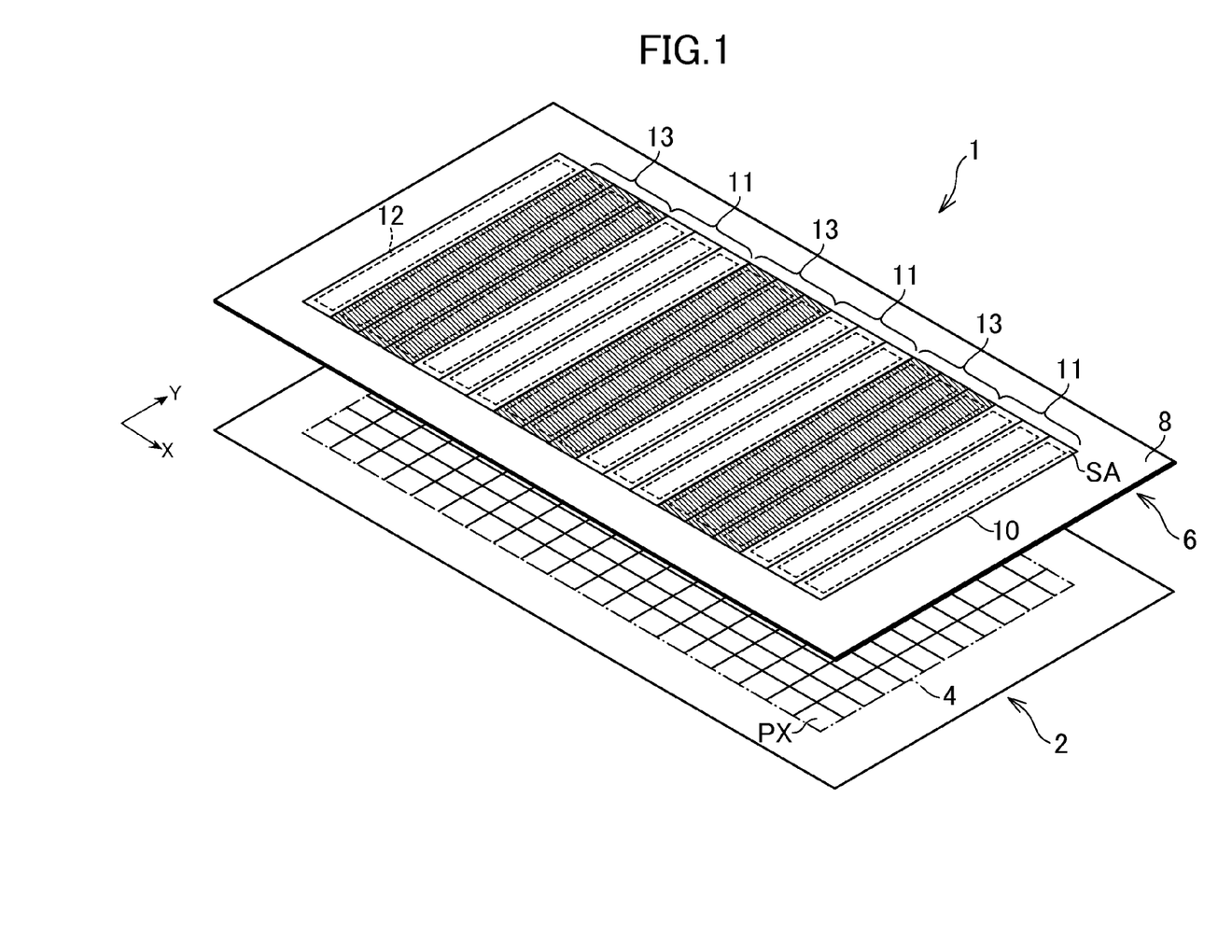
FIG. 1 is a view showing a stereoscopic image display device of an embodiment of the invention.

FIG. 1 is a view showing a stereoscopic image display device 1 of an embodiment of the invention.

A stereoscopic image display device 1 is a display device to display a stereoscopic image in a parallax barrier system. The display device 1 includes a display panel 2 to display an image for a left eye and an image for a right eye and a parallax barrier panel 6 arranged on a display surface side of the display panel 2. In the present embodiment, the display panel 2 is an active matrix liquid crystal panel. The display panel 2 includes a pair of substrates and a liquid crystal sandwiched between the pair of substrates and is sealed with a seal. Plural pixels PX are defined in a matrix form in a display area 4 indicated by one-dot chain line. The image for the left eye and the image for the right eye are displayed in the display area 4. For example, the display panel 2 may be a TN (Twisted Nematic) mode, an STN (Super Twisted Nematic) mode, a VA (Vertical Alignment) mode or an IPS (In-Panel Switching) mode. The display panel 2 is not limited in the structure and mode. Besides, the display panel 2 is not limited to the liquid crystal panel, and an organic electroluminescence panel may be used as the display panel 2.

The parallax barrier panel 6 is a liquid crystal panel used to enable naked-eye stereoscopic vision by separating the image for the left eye and the image for the right eye displayed on the display panel 2. The parallax barrier panel 6 includes a first transparent substrate 8 disposed on the display surface side of the display panel 2, and a second transparent substrate 10 disposed on the side opposite to the display panel 2 across the first transparent substrate 8. A liquid crystal layer 16 (described later) is sandwiched between both the substrates and is sealed with a seal member 18 (described later) (see FIG. 4 and FIG. 5). The second transparent substrate 10 covers the display area 4. The parallax barrier panel 6 includes plural sub-areas SA extending in a Y direction (hereinafter referred to as a longitudinal direction) in the area covered with the second transparent substrate 10. The plural sub-areas SA are arranged in an X direction (hereinafter referred to as a lateral direction) perpendicular to the Y direction. In an example, one sub-area SA may cover one pixel line. The first transparent substrate 8 has a stripe-shaped electrode 12 formed therein and provided in each of the sub-areas SA. The electrode 12 extends in the longitudinal direction and controls the liquid crystal layer 16. Each of the sub-areas SA is switchable between a light-transmitting state to allow light to pass through and a light-shielding state to shield light. The electrode 12 is an ITO (indium tin oxide) electrode. Each light-transmitting area 11 is formed of plural sub-areas SA in the light-transmitting state and continuously arranged. Each light-shielding area 13 is formed plural sub-areas SA in the light-shielding state and continuously arranged. The liquid crystal layer 16 is controlled so that the light-transmitting areas 11 and the light-shielding areas 13 are alternately arranged in the lateral direction. Here, an example is shown in which each of the light-transmitting areas 11 and the light-shielding areas 13 is formed of three continuous sub-areas SA. The number of the sub-areas SA constituting each of the light-transmitting areas 11 and the light-shielding areas 13 is not limited to three.

Figure 2:
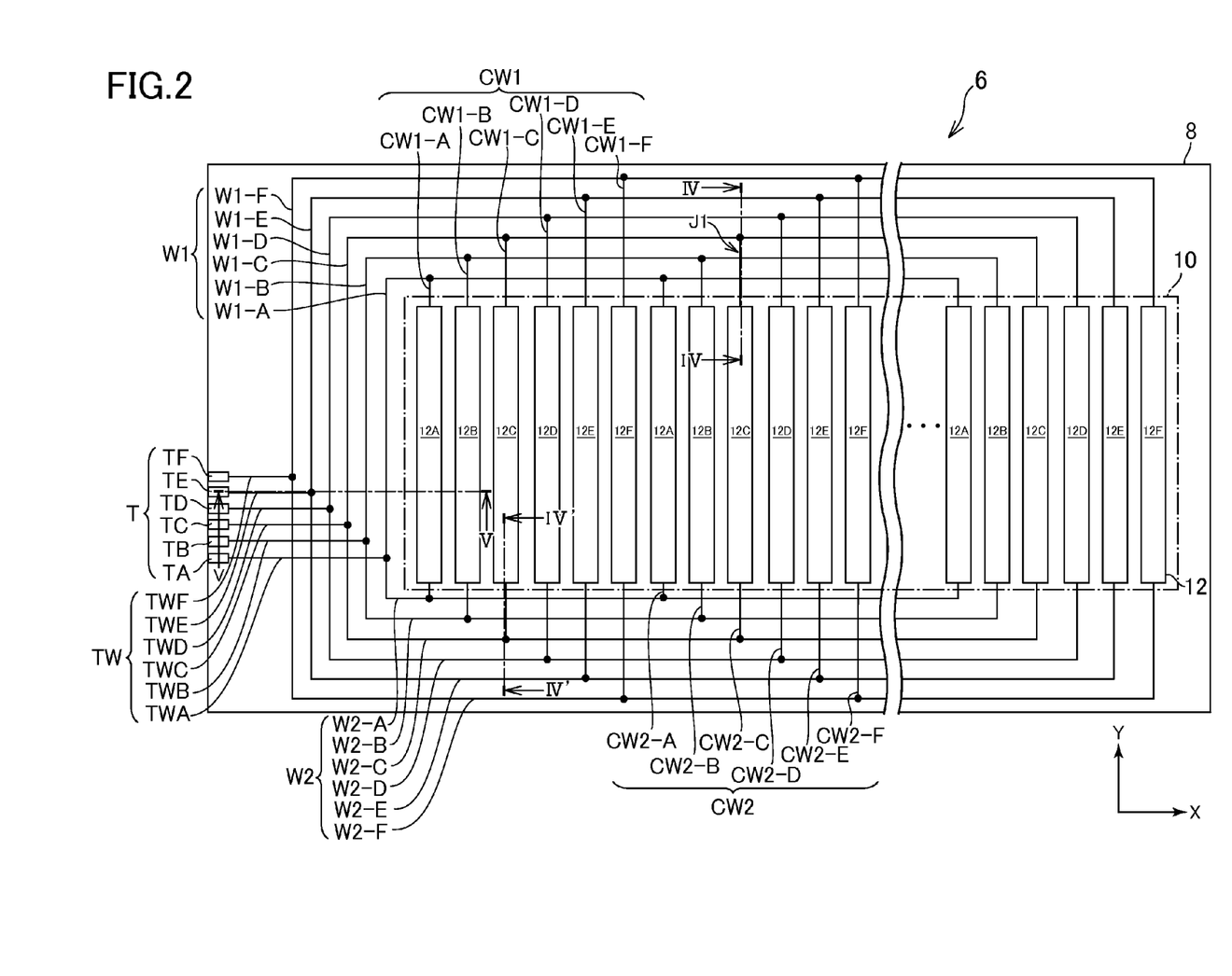
FIG. 2 is a top view of a parallax barrier panel.
Figure 3:
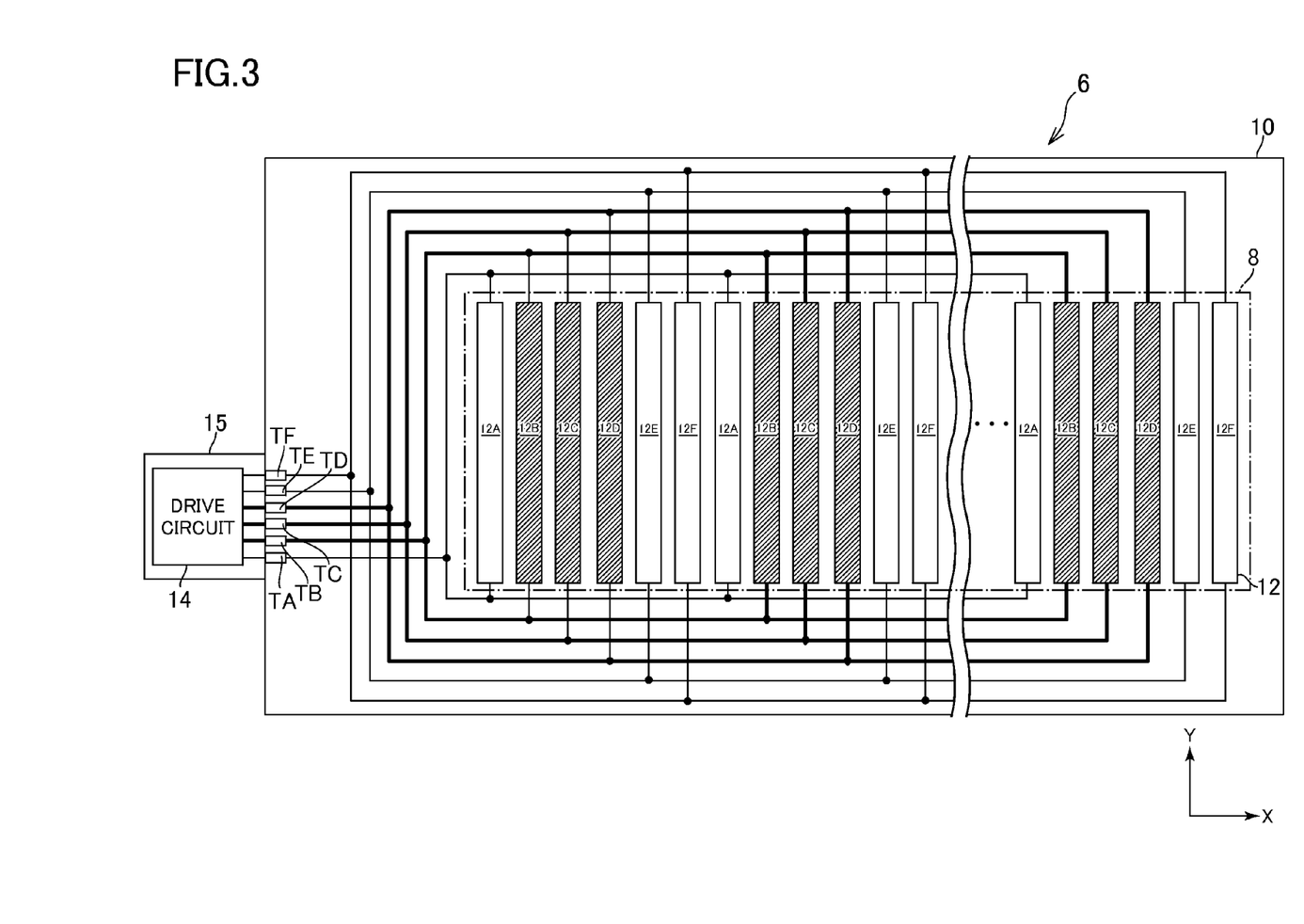
FIG. 3 is a view showing a state where an FPC (Flexible Printed Circuits) board is attached to the parallax barrier panel.

FIG. 2 is a top view of the parallax barrier panel 6, and FIG. 3 is a view showing a state in which an FPC (Flexible Printed Circuits) substrate 15 on which a drive circuit 14 for driving the parallax barrier panel 6 is formed is attached to the parallax barrier panel 6. As shown in FIG. 2, the first transparent substrate 8 includes plural terminals T to which the FPC substrate 15 is attached. The plural terminals T are arranged along, for example, an edge of the first transparent substrate 8. Specifically, as shown in FIG. 2, the plural terminals T are formed lateral to an area where the plural sub-areas SA are formed, and are arranged in the longitudinal direction along a right or left edge of the first transparent substrate 8. In the present disclosure, although an example is shown in which six terminals TA, TB, TC, TD, TE and TF are provided, the number of the terminals is not limited to six. Incidentally, as shown in FIG. 2, the six terminals T are arranged in the sequence of TA, TB, TC, TD, TE and TF from below.

Besides, the plural electrodes 12 are provided on the first transparent substrate 8. The plural electrodes 12 are electrically connected to the terminals T. For example, as the plural electrodes 12, six kinds of electrodes 12A, 12B, 12C, 12D, 12E and 12F are provided on the first transparent substrate 8. The first transparent substrate 8 includes plural electrodes 12A as the first kind of electrode. The same applies to the other kinds of electrodes 12B, 12C, 12D, 12E and 12F. The electrode 12A is electrically connected to the terminal TA. Similarly, the electrode 12B, the electrode 12C, the electrode 12D, the electrode 12E and the electrode 12F are respectively electrically connected to the terminal TB, the terminal TC, the terminal TD, the terminal TE and the terminal TF. These six kinds of electrodes 12 are repeatedly arranged from left to right in the sequence of the electrodes 12A, 12B, 12C, 12D, 12E and 12F. In the present embodiment, a normally white mode is adopted. Accordingly, when a voltage is applied to the electrode 12, the sub-area SA with the electrode 12 is switched from the light-transmitting state to the light-shielding state. M (six in the example of the specification) electrodes 12 continuously arranged in the lateral direction constitute one set (unit arrangement). The plural sets are arranged in the lateral direction.

The drive circuit 14 is configured to supply voltage to only plural partial terminals T among all the plural terminals T. The supplied voltage is applied to the plural kinds of electrodes 12 electrically connected to these plural terminals T, and the sub-areas SA corresponding to these plural electrodes 12 are brought into the light-shielding state. As a result, the light-shielding area 13 formed of the plural continuous sub-areas SA in the light-shielding state and the light-transmitting area 11 formed of the plural continuous sub-areas SA in the light-transmitting state are alternately formed. In the example, each of the light-transmitting areas 11 and the light-shielding areas 13 is formed of the three sub-areas SA, and the voltage is supplied to three of the six terminals T. Thus, the light-shielding area 13 formed of the three continuous sub-areas SA in the light-shielding state and the light-transmitting area 11 formed of the three continuous sub-areas SA in the light-transmitting state are alternately formed (see FIG. 1).

Besides, the stereoscopic image display device 1 has a function (hereinafter referred to as a multi-position function) to enable naked-eye stereoscopic vision even if a viewing point of a user is changed. Specifically, the drive circuit 14 selects the plural terminals T (in the present example, three terminals) to which voltage is supplied among all the plural terminal T, according to the detection result of a viewing point position detection sensor (not shown) to detect the position of the viewing point of the user (for example, the position of the head). Thus, the light-transmitting area 11 and the light-shielding area 13 are movable in the lateral direction according to the position of the viewing point of the user. In the example of FIG. 3, the terminals TB, TC and TD are selected as the plural terminals T to which the voltage is supplied. Thus, the voltage is applied to the electrode 12B, the electrode 12C and the electrode 12D, and the sub-areas SA including these three kinds of electrodes 12 are brought into the light-shielding state.

Return is made to the description of FIG. 2. In the parallax barrier panel 6, the electrical connection between the terminal T and the electrode 12 is realized as follows. That is, the first transparent substrate 8 has plural lead-out electric lines TW (third electric line of the claims) respectively connected to the terminals T. In the example of the disclosure, since the six terminals T are provided to the panel, the panel has the six lead-out electric lines TWA, TWB, TWC, TWD, TWE and TWF. The lead-out electric line TWA is connected to the terminal TA. Similarly, the lead-out electric line TWB and the lead-out electric line TWC are respectively connected to the terminals TB and TC. The lead-out electric line TWD, the lead-out electric line TWE and the lead-out electric line TWF are respectively connected to the terminal TD, the terminal TE and the terminal TF.

Besides, as shown in FIG. 2, the first transparent substrate 8 has a first electric line W1 and a second electric line W2 provided for each of the terminals T. The first electric line W1 is connected to the terminal T through the lead-out electric line TW. Similarly, the second electric line W2 is connected to the terminal T through the lead-out electric line TW. In the example of the disclosure, since the six terminals T are provided, a first electric line W1-A and a second electric line W2-A electrically connected to the terminal TA, the panel has a first electric line W1-B and a second electric line W2-B electrically connected to the terminal TB, and a first electric line W1-C and a second electric line W2-C electrically connected to the terminal TC. Besides, the panel has a first electric line W1-D and a second electric line W2-D electrically connected to the terminal TD, a first electric line W1-E and a second electric line W2-E electrically connected to the terminal TE, and a first electric line W1-F and a second electric line W2-F electrically connected to the terminal TF. In a case where M electrodes 12 (in the present example, six electrodes 12) exist in the unit arrangement of the electrodes 12, the panel has M first electric lines to connect the M electrodes 12 and the M terminals, and M second electric lines to connect the M electrodes 12 and the M terminals.

The first electric line W1-A and the second electric line W2-A are connected to the end point of the lead-out electric line TWA. Similarly, the first electric line W1-B and the second electric line W2-B are connected to the end point of the lead-out electric line TWB, and the first electric line W1-C and the second electric line W2-C are connected to the end point of the lead-out electric line TWC. Besides, the first electric line W1-D and the second electric line W2-D are connected to the end point of the lead-out electric line TWD, the first electric line W1-E and the second electric line W2-E are connected to the end point of the lead-out electric line TWE, and the first electric line W1-F and the second electric line W2-F are connected to the end point of the lead-out electric line TWF. Each of the first electric lines W1-A to W1-F includes a portion extending in the longitudinal direction from the end point of the lead-out electric line T, and another portion formed on the upper side of the electrode 12 (formed nearer to the upper edge of the panel 6 than the electrode 12) and extending in the lateral direction. Similarly, each of the second electric lines W2-A to W2-F includes a portion extending in the longitudinal direction from the end point of the lead-out electric line T, and another portion formed on the lower side of the electrode 12 (formed nearer to the lower edge of the panel 6 than the electrode 12) and extending in the lateral direction.

Each of the electrodes 12 is provided with a first connection electric line CW1 connected to the upper end of the electrode 12 and a second connection electric line CW2 connected to the lower end of the electrode 12. Each of the electrodes 12 is connected to the first electric line W1 through the first connection electric line CW1, and is connected to the second electric line W2 through the second connection electric line CW2. Thus, each of the electrodes 12 is electrically connected to the terminal T through the two paths. In the example of the disclosure, the six kinds of electrodes 12 exist. Thus, as shown in FIG. 2, the panel has six kinds of first connection electric lines CW1-A, CW1-B, CW1-C, CW1-D, CW1-E and CW1-F. The first connection electric lines CW1-A, CW1-B, CW1-C, CW1-D, CW-1E and CW1-F are respectively connected to the electrodes 12A, 12B, 12C, 12D, 12E and 12F. As shown in FIG. 2, the first connection electric lines CW1-A, CW1-B, CW1-C, CW1-D, CW-1E and CW1-F are also respectively connected to the first electric lines W1-A, W1-B, W1-C, W1-D, W1-E and W1-F.

As shown in FIG. 2, the parallax barrier panel 6 is provided with second connection electric lines CW2-A, CW2-B, CW2-C, CW2-D, CW2-E and CW2-F. The second connection electric lines CW2-A, CW2-B, CW2-C, CW2-D, CW2-E and CW2-F are respectively connected to the electrodes 12A, 12B, 12C, 12D, 12E and 12F. As shown in FIG. 2, the second connection electric lines CW2-A, CW2-B, CW2-C, CW2-D, CW2-E and CW2-F are also respectively connected to the second electric lines W2-A, W2-B, W2-C, W2-D, W2-E and W2-F.

In the present embodiment, as described above, the upper ends (ends on the upper side of the panel) of the electrodes 12 are connected to the portions of the M first electric lines (in the present example, six first electric lines) extending in the lateral direction. The lower ends (ends on the lower side of the panel) of the electrodes 12 are connected to the portions of the M second electric lines (in the present example, six first electric lines) extending in the lateral direction. The panel is provided with the M lead-out electric lines. The M first electric lines are respectively connected to the lead-out electric lines, and the M second electric lines are also respectively connected to the lead-out electric lines TW. The M terminals T are provided at the edge of the panel. The M terminals T are connected to the M first electric lines through the lead-out electric lines TW, and are connected to the M second electric lines through the common lead-out electric lines TW. The Nth (M≥N≥1) electrode in each of the unit arrangements (sets) of electrodes is connected to the Nth terminal among the M terminals.

Figure 4:
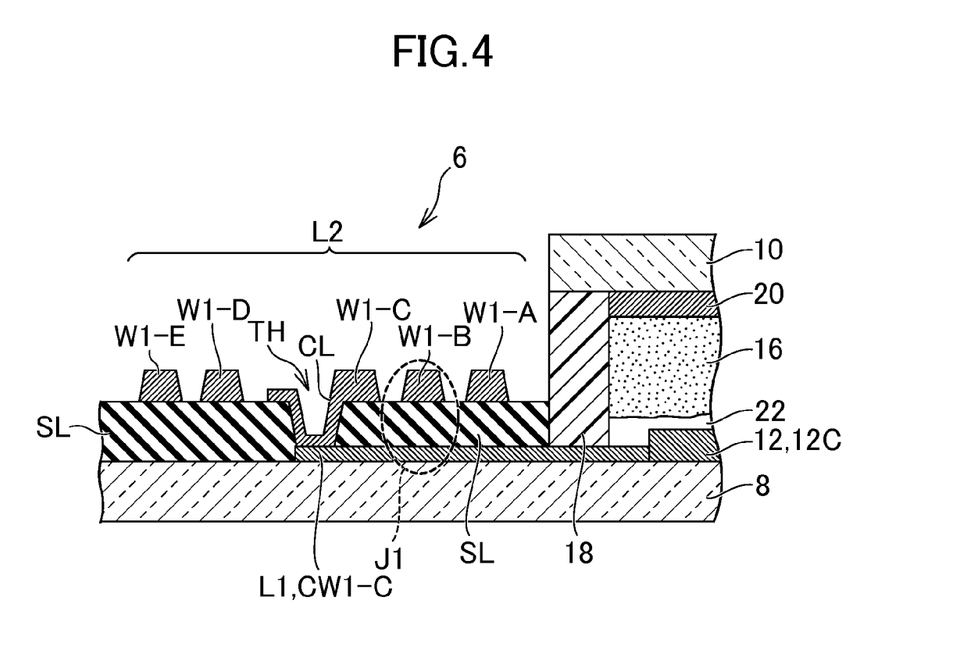
FIG. 4 is a sectional view of the parallax barrier panel taken along line IV-IV.
Figure 5:
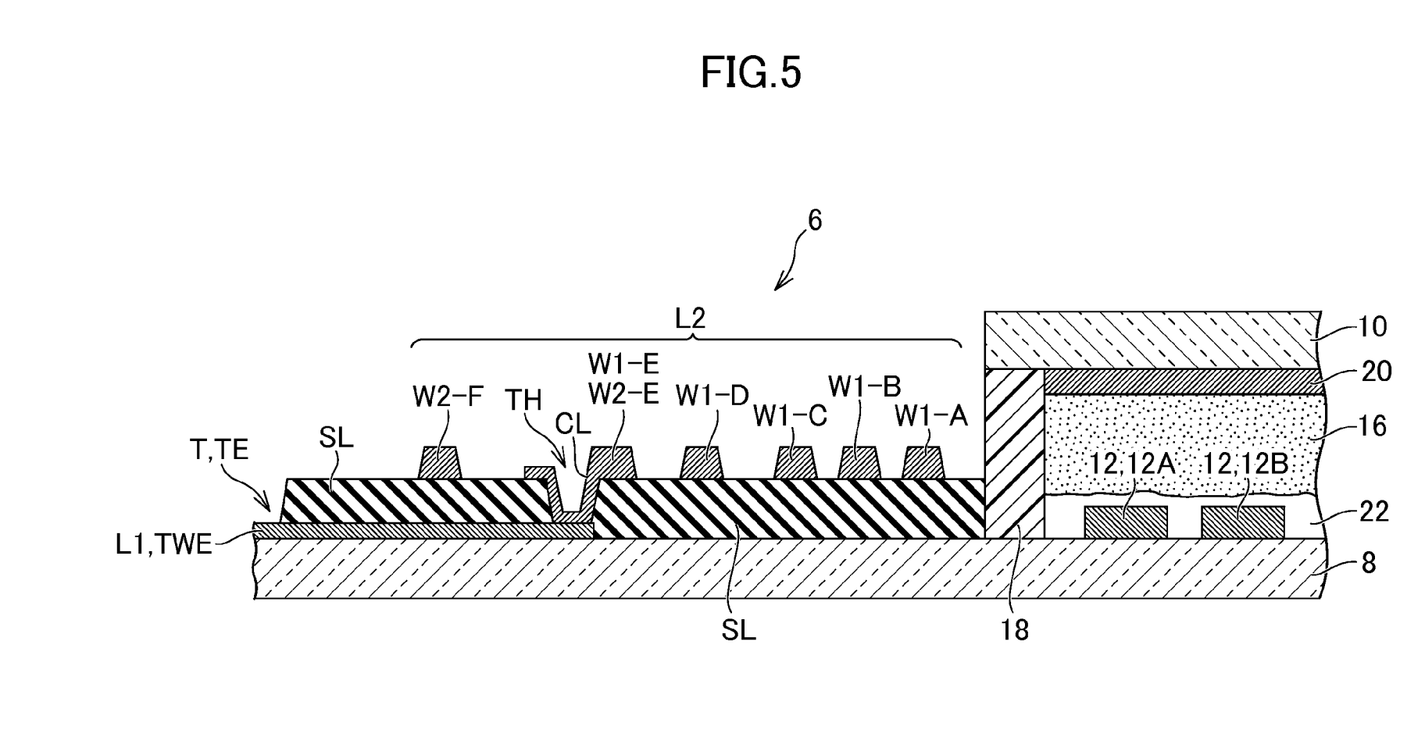
FIG. 5 is a sectional view of the parallax barrier panel taken along line V-V.

FIG. 4 is a sectional view of the parallax barrier panel 6 taken along line IV-IV shown in FIG. 2. FIG. 5 is a sectional view of the parallax barrier panel 6 taken along line V-V shown in FIG. 2. As shown in these drawings, the parallax barrier panel 6 includes the first transparent substrate 8 on which the electrodes 12 are formed, and the second transparent substrate 10. The liquid crystal layer 16 is arranged between the two substrates 8 and 10, and is sealed with a seal member 18. The electrodes 12 are covered with an alignment layer 22. A common electrode 20 is provided on the lower surface of the second transparent substrate 10. A capacitor is formed of the common electrode 20 and the electrode 12. Reference character J1 of FIG. 2 and FIG. 4 denotes a crossing portion between the first connection electric line CW1-C and the first electric line W1-B. Incidentally, a sectional view taken along line IV'-IV' shown in FIG. 2 is similar to FIG. 4. However, in the sectional view taken along line IV'-IV', the first electric lines W1-A to W1-E of FIG. 4 are respectively replaced by the second electric lines W2-A to W2-E, and the first connection electric line CW1-C of FIG. 4 is replaced by the second connection electric line CW2-C.

The respective first connection electric lines CW1-A to CW1-F extend in the longitudinal direction to be connected to the portions of the first electric lines W1-A to W1-F extending in the lateral direction. Thus, as shown in FIG. 2, the first connection electric lines CW1-B to CW1-F except the first connection electric line CW1-A connected to the first electric line W1-A formed closest to the electrode 12 cross one or more first electric lines W1. For example, the first connection electric line CW1-C crosses the first electric line W1-B (see FIG. 4). Thus, it is necessary to prevent short-circuit between the first connection electric line CW1 and the first electric line W1 crossing each other. Similarly, the respective second connection electric lines CW2-A to CW2-F extend in the longitudinal direction, and are connected to the portions of the second electric lines W2-A to W2-F extending in the lateral direction. Thus, the second connection electric lines CW2-B to CW2-F except the second connection electric line CW2-A connected to the second electric line W2-A formed closest to the electrode 12 cross one or more second electric lines W2 (see FIG. 2). Thus, it is necessary to prevent short-circuit between the second connection electric line CW2 and the second electric line W2 crossing each other. Besides, the lead-out electric lines TWA to TWE cross one or more second electric lines W2 (see FIG. 2). For example, the lead-out electric line TWE crosses the second electric line W2-F. Thus, it is necessary to prevent short-circuit between the lead-out electric line TW and the second electric line W2 crossing each other.

As shown in FIG. 4 and FIG. 5, a first circuit layer L1, a second circuit layer L2 above the first circuit layer L1, and an insulating layer SL between the first circuit layer L1 and the second circuit layer L2 are formed on the first transparent substrate 8. The first connection electric line CW1 and the first electric line W1 are formed in the circuit layers different from each other. Besides, the second connection electric line CW2 and the second electric line W2 are formed in the circuit layers different from each other. Besides, the lead-out electric line TW and the electric lines W1 and W2 are formed in the circuit layers different from each other. In the present embodiment, as shown in FIG. 4 and FIG. 5, the lead-out electric line TW, the first connection electric line CW1 and the second connection electric line CW2 are formed in the first circuit layer L1. The first electric line W1 and the second electric line W2 are formed in the circuit layer L2. Thus, as shown in FIG. 4, in the crossing portion J1, the first connection electric line CW1-C and the first electric line W1-B are formed in the different circuit layers, and thus short-circuit between both the electric lines is prevented.

Incidentally, the insulating layer SL includes through-holes (openings) TH near the end point of each of the lead-out electric lines TW, near the end point of each of the first connection electric lines CW1 and near the end point of each of the second connection electric lines CW2. A conductive layer CL is provided so as to cover each of the through-holes TH. Thus, each of the plural first connection electric lines CW1 is connected to one first electric line W1, and each of the plural second connection electric lines CW2 is connected to one second electric line W2. Besides, each of the lead-out electric lines TW is connected to the pair of the first electric line W1 and the second electric line W2. That is, the lead-out electric line TW is connected to the first electric line and the second electric line in the through-hole formed in the insulating layer SL.

In the parallax barrier panel 6, the electrode 12 is provided in each of the sub-areas SA so that the liquid crystal layer 16 can be controlled in units of sub-areas SA. Thus, in the parallax barrier panel 6, the lateral width of the electrode 12 is smaller than that in the case where the electrode 12 having almost the same dimension as the shielding area 13 (or the light-transmitting area 11) is provided in each of the shielding areas 13 (or the light-transmitting areas 11). Thus, cut (tear) in the electrode 12 is apt to occur. Thus, it is necessary that even if the cut in the electrode 12 occurs, a stereoscopic image can be recognized.

Figure 6:
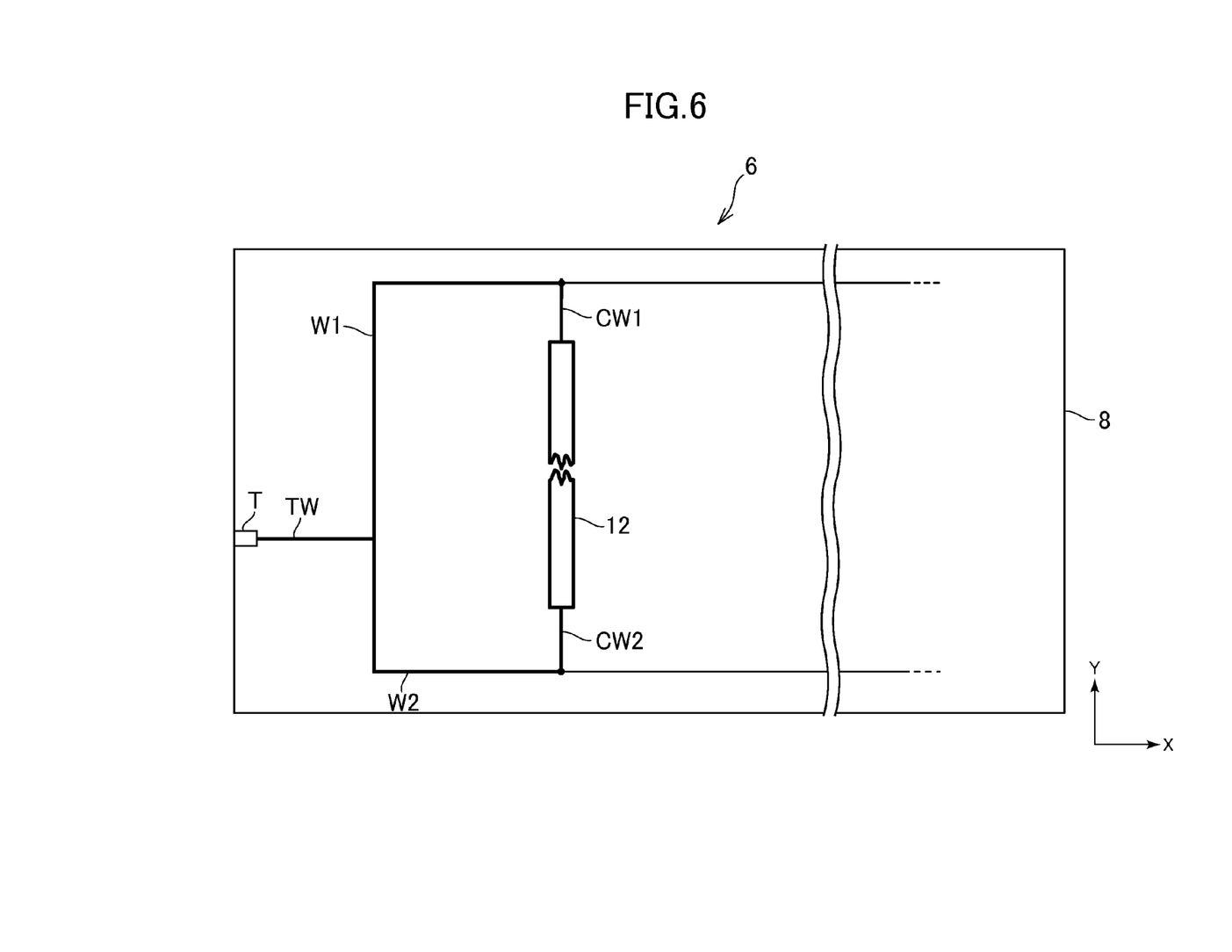
FIG. 6 is a view showing a state where an electrode is cut.

In the stereoscopic image display device 1, not only the upper end of the electrode 12, but also the lower end of the electrode 12 is connected to the terminal T. Thus, even if the electrode 12 is cut, as shown in FIG. 6 showing the state where the electrode 12 is cut, voltage is applied to the whole electrode 12. That is, in a case where only the upper end of the electrode 12 is connected to the terminal T, voltage is applied to only the upper half of the electrode 12 when the electrode 12 is cut. However, in the stereoscopic image display device 1, even if the electrode 12 is cut, voltage is applied to the whole electrode 12.

Figure 7:
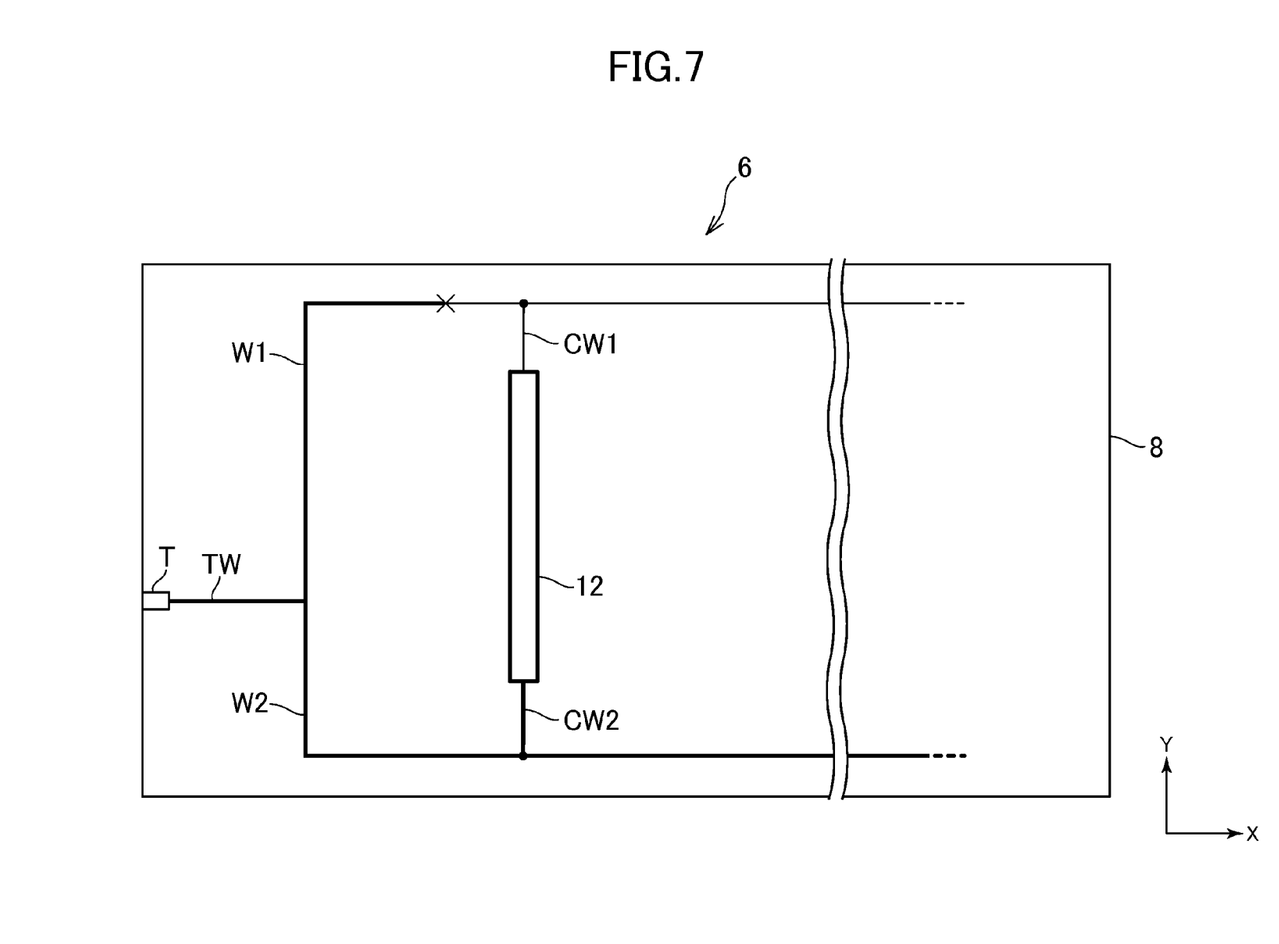
FIG. 7 is a view showing a state where a first electric line is cut.

Further, in the stereoscopic image display device 1, even if one of the first electric line W1 and the second electric line W2 is cut, voltage can be applied to the electrode 12 through the other electric line. For example, in FIG. 7 showing a state where the first electric line W1 is cut, voltage is applied to the electrode 12 through the second electric line W2.

As stated above, the first electric line W1 for applying voltage to the electrode 12 is connected to the upper end of the electrode 12, and the second electric line W2 for applying the voltage to the electrode 12 is connected to the lower end of the electrode 12. Thus, even when the electrode 12 is cut, a viewer can recognize a stereoscopic image.

Besides, both of the first electric line W1 connected to the upper end of the electrode 12 and the second electric line W2 connected to the lower end of the electrode 12 are connected to the common terminal T to which the FPC substrate 15 is attached. For example, both the first electric line W1-C and the second electric line W2-C connected to the electrode 12C (first electrode) are connected to the terminal TC (first terminal). Both of the first electric line W1-B and the second electric line W2-B connected to the electrode 12B (second electrode) are connected to the terminal TB (second terminal) below and adjacent to the terminal TC (see FIG. 2). Thus, the number of the terminals T can be reduced as compared with the case where the terminal T is provided for each of the first electric line W1 and the second electric line W2.

Besides, the electric line extending from the terminal TC to the electrode 12C and the electric line extending from the terminal TB to the electrode 12B respectively include portions crossing each other in the crossing portion J1 (see FIG. 2). One (part of the first connection electric line CW1-C in FIG. 4) of the two portions crossing each other is formed in the first circuit layer L1, and the other (part of the first electric line W1-B in FIG. 4) is formed in the second circuit layer L2. Thus, short-circuit between both the electric lines can be prevented.

Besides, the electrodes 12 include the unit arrangement (one set) formed of the plural (M) electrodes 12 arranged in the lateral direction in the order of the electrode 12A, the electrode 12B, the electrode 12C, the electrode 12D, the electrode 12E and the electrode 12F. The plural unit arrangements are repeated in the lateral direction (see FIG. 2). Electrodes (for example, the plural electrodes 12A) located at the same order (same position) in the respective unit arrangements are connected to the common first electric line and the common second electric line. For example, the plural electrodes 12A located at the leftmost position in the unit arrangements are connected to the common first electric line W1-A and the common second electric line W2-A. Similarly, the plural electrodes 12B located at the second position from the left in the unit arrangements are connected to the common first electric line W1-B and the common second electric line W2-B. Similarly, the plural electrodes 12C located at the third position from the left in the unit arrangements are connected to the common first electric line W1-C and the common second electric line W2-C. The plural electrodes 12D located at the fourth position from the left are connected to the common first electric line W1-D and the common second electric line W2-D. The plural electrodes 12E located at the fifth position from the left are connected to the common first electric line W1-E and the common second electric line W2-E. The plural electrodes 12F located at the rightmost position are connected to the common first electric line W1-F and the common second electric line W2-F. Thus, the number of the electric lines can be reduced as compared with the case where the first electric line W1 and the second electric line W2 are provided for each of the electrodes 12.

Figure 8:
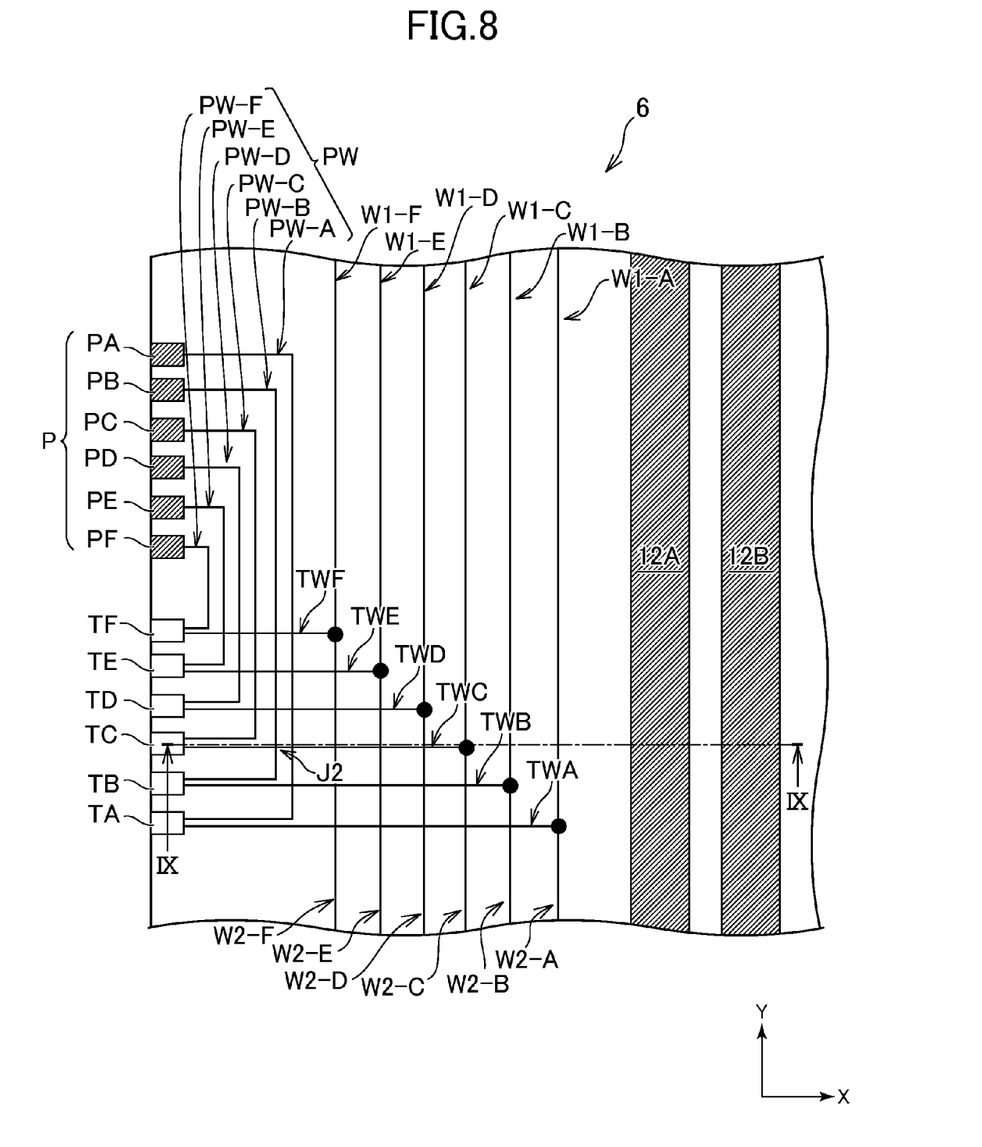
FIG. 8 is a view showing a probe terminal.

Incidentally, the parallax barrier panel 6 may be provided with plural probe terminals P for connecting the parallax barrier panel 6 to a probe circuit board for inspection. FIG. 8 is a view showing the probe terminals P and is a view showing a part of the parallax barrier panel 6 (accurately, the first transparent substrate 8). The number of the probe terminals P is equal to the number of the terminals T. The plural probe terminals P are arranged along, for example, an edge of the first transparent substrate 8. Specifically, as shown in FIG. 8, the plural probe terminals P are formed, for example, on the lateral side of the area where the plural sub-areas SA are formed, and are arranged in the longitudinal direction along the right or left edge of the first transparent substrate 8. In FIG. 8, the six probe terminals P (that is, probe terminals PA, PB, PC, PD, PE and PF) are formed on the first transparent substrate 8, and each of the probe terminals P is connected to one terminal T through an inspection electric line PW. The plural probe terminals P and the plural terminals T may be arranged along the common edge of the first transparent substrate 8. For example, both the plural probe terminals P and the plural terminals T may be arranged along the left edge (or right edge) of the first transparent substrate 8.

The probe terminal PA is the probe terminal P for inspecting a circuit including the electric lines (the lead-out electric line TWA, the electric lines W1-A and W2-A, and the connection electric lines CW1-A and CW2-A) extending from the terminal TA to the electrode 12A, and the electrode 12A. As shown in FIG. 8, the probe terminal PA is connected to the terminal TA through the inspection electric line PW-A. Besides, the probe terminal PB is the probe terminal P for inspecting a circuit including the electric lines extending from the terminal TB to the electrode 12B and the electrode 12B. As shown in FIG. 8, the probe terminal PB is connected to the terminal TB through the inspection electric line PW-B. Besides, the probe terminal PC is the probe terminal P for inspecting a circuit including the electric lines extending from the terminal TC to the electrode 12C and the electrode 12C. As shown in FIG. 8, the probe terminal PC is connected to the terminal TC through the inspection electric line PW-C.

Besides, the probe terminal PD is the probe terminal P for inspecting a circuit including the electric lines extending from the terminal TD to the electrode 12D and the electrode 12D. As shown in FIG. 8, the probe terminal PD is connected to the terminal TD through the inspection electric line PW-D. Besides, the probe terminal PE is the probe terminal P for inspecting a circuit including the electric lines extending from the terminal TE to the electrode 12E and the electrode 12E. As shown in FIG. 8, the probe terminal PE is connected to the terminal TE through the inspection electric line PW-E. Besides, the probe terminal PF is the probe terminal P for inspecting a circuit including the electric lines extending from the terminal TF to the electrode 12F and the electrode 12F. As shown in FIG. 8, the probe terminal PF is connected to the terminal TF through the inspection electric line PW-F. Incidentally, reference character J2 denotes a crossing portion between the inspection electric line PW-B and the lead-out electric line TWC.

As shown in FIG. 8, each of the inspection electric lines PW-A to PW-E crosses one or more lead-out electric lines TW. For example, the inspection electric line PW-B crosses the lead-out electric line TW-C. Thus, it is necessary to prevent short-circuit between the inspection electric line PW and the lead-out electric line TW crossing each other.

Figure 9:
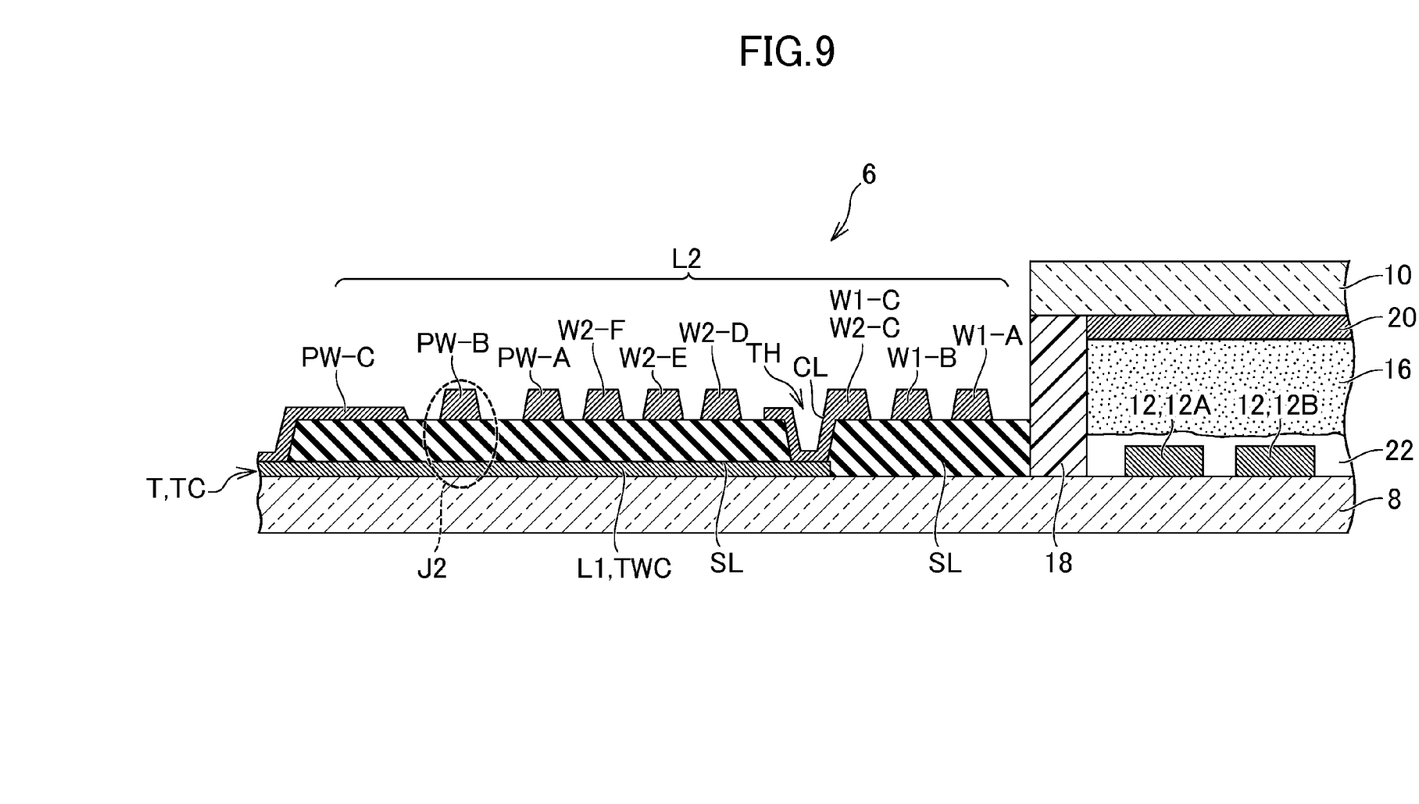
FIG. 9 is a sectional view of the parallax barrier panel taken along line IX-IX.

Then, the two-layer structure formed of the first circuit layer L1 and the second circuit layer L2 is used. The inspection electric line PW is formed in the circuit layer different from the lead-out electric line TW. For example, the inspection electric line PW is formed in the second circuit layer L2. By doing so, while the inspection electric line PW and the lead-out electric line TW are crossed each other, the short-circuit therebetween is prevented. FIG. 9 is a sectional view of the parallax barrier panel 6 taken along line IX-IX shown in FIG. 8. As shown in the drawing, the inspection electric lines PW are formed in the second circuit layer L2, and the lead-out electric lines TW are formed in the first circuit layer L1. Thus, in the crossing portion J2, the inspection electric line PW-B and the lead-out electric line TWC are formed in the different circuit layers, and short-circuit between both the electric lines is prevented.

As described above, although the electric line extending from the terminal TC (first terminal) to the electrode 12C (first electrode) and the inspection electric line PW-B connecting the terminal TB (second terminal) and the probe terminal PB respectively include portions crossing each other in the crossing portion J2 (see FIG. 8), one of the two crossing portions (part of the lead-out electric line TWC in FIG. 9) is formed in the first circuit layer L1, and the other (part of the inspection electric line PW-B in FIG. 9) is formed in the second circuit layer L2. Thus, short-circuit between both the electric lines can be prevented.

The invention is not limited to the above embodiment, and various modifications can be made. For example, the configuration described in the embodiment can be replaced by substantially the same configuration, a configuration having the same functions and effects, or a configuration capable of achieving the same object.

Specifically, the first electric lines W1 and the second electric lines W2 may be directly connected to the common terminals T without passing through the lead-out electric lines TW.

The lead-out electric lines TW, the first electric lines W1, the second electric lines W2, the first connection electric lines CW1, and the second connection electric lines CW2 may be respectively formed in either of the first circuit layer L1 and the second circuit layer L2. The same applies to the inspection electric lines PW. Incidentally, when both of two electric lines crossing each other are formed in one of the first circuit layer L1 and the second circuit layer L2, one of the electric lines has only to be formed in the other circuit layer in the crossing portion where the two electric lines cross each other.

What is claimed is:
1. A stereoscopic image display device comprising:
a display panel including pixels; and
a parallax barrier panel including a liquid crystal layer and disposed on a display surface side of the display panel, wherein
the parallax barrier includes:
a plurality of sub-areas arranged in a first direction, each sub-area extending in a second direction perpendicular to the first direction, a portion of the plurality of sub-areas being configured in a light-transmitting state and a portion of the plurality of sub-areas being configured in a light-shielding state,
a plurality of light-shielding areas each of which is formed by the plurality of sub-areas configured in the light-shielding state, a plurality of light-transmitting areas each of which is formed by the plurality of sub-areas configured in the light-transmitting state and which are arranged alternately with the plurality of light-shielding areas in the first direction, an electrode provided in each of the plurality of sub-areas, extending in the second direction and for controlling a light transmittance of the liquid crystal layer, a first electric line connected to one end of two ends of the electrode in the second direction and for applying a voltage to the electrode, a second electric line connected to the other end of the two ends of the electrode in the second direction and for applying the voltage to the electrode, a connecting terminal electrically connected to the first electric line and the second electric line by a first lead-out line, an external circuit board having a drive circuit mounted thereon for driving the parallax barrier panel and attached to the connecting terminal, and a probe terminal for inspecting an electrical connection between the connecting terminal and the electrode, the probe terminal being connected to the connecting terminal by an inspection electric line, the inspection electric line including a second lead-out line that overlaps with the first lead-out line and that extends from the connecting terminal along the first lead-out line.

2. The stereoscopic image display device according to claim 1 wherein the parallax barrier panel includes:

a first layer, a second layer and an insulating layer between the first layer and the second layer are formed on the transparent substrate, the first lead-out line is formed by the first layer, and
the second lead-out line is formed by the second layer.

3. A stereoscopic image display device comprising:
a display panel including pixels; and
a parallax barrier panel disposed on a display surface side of the display panel, wherein the parallax barrier panel includes a plurality of stripe-shaped electrodes arranged in a first direction and each extending in a second direction crossing the first direction, a first edge along the first direction,
a second edge opposite to the first edge,
a third edge along the second direction, M (M≥2) first electric lines each of which is electrically connected to one end of the stripe-shaped electrode at a vicinity of the first edge and which are arranged along the first edge, M second electric lines each of which is electrically connected to another end of the stripe-shaped electrode at a vicinity of the second edge and which are arranged along the second edge, and M terminals electrically connected to the first electric lines and the second electric lines, and wherein the M stripe-shaped electrodes are continuously arranged to form one set, a plurality of the sets are arranged in the first direction, the first electric line and the second electric line are electrically connected to a third electric line, the third electric line is electrically connected to the terminal, the Nth (M≥N≤1) stripe-shaped electrode among the M stripe-shaped electrodes included in each of the plurality of the sets is electrically connected to the Nth terminal among the M terminals, the first electric line and the second electric line are provided in a first layer, the third electric line is formed in a second layer different from the first layer, an external circuit board is attached to the M terminals and has a drive circuit mounted thereon for driving the parallax barrier panel, M probe terminals for inspecting an electrical connection between M terminals and M stripe-shaped electrodes are connected to M terminals, respectively, by M inspection electric lines each including lead-out lines, and the Nth inspection electric line of M inspection electric lines includes the lead-out line that overlaps with Nth third electric line of M third electric lines and extends from the Nth terminal along the Nth third electric line.

4. The stereoscopic image display device according to claim 3, wherein the stripe-shaped electrode provides a light-transmitting area or a light-shielding area between the first edge and the second edge.

5. The stereoscopic image display device according to claim 3, wherein an insulating layer is provided between the first layer and the second layer, the insulating layer includes an hole, and the first electric line and the second electric line are electrically connected to the third electric line through the hole.

* * * * *